United States Patent
Coleman et al.

(10) Patent No.: US 7,249,861 B2
(45) Date of Patent: Jul. 31, 2007

(54) KEYPAD ASSEMBLY

(75) Inventors: Travis R. Coleman, Sunrise, FL (US);
Jody H. Akens, Weston, FL (US);
Christopher D. Crawford, Tamarac, FL (US); Ali H. Zaidi, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 628 days.

(21) Appl. No.: 10/800,803

(22) Filed: Mar. 15, 2004

(65) Prior Publication Data

US 2005/0202787 A1    Sep. 15, 2005

(51) Int. Cl.
*H04M 1/22* (2006.01)

(52) U.S. Cl. .......................... 362/24; 200/314; 362/27; 362/30; 362/267

(58) Field of Classification Search ................. 362/24, 362/23, 27, 28, 29, 30, 559, 267, 800; 379/368; 200/314, 315, 512–517
See application file for complete search history.

(56) References Cited

U.S. PATENT DOCUMENTS

| | | | | |
|---|---|---|---|---|
| 4,349,705 A | * | 9/1982 | Kuhfus | 379/361 |
| 4,636,593 A | * | 1/1987 | Novak et al. | 200/5 A |
| 4,710,597 A | * | 12/1987 | Loheac | 200/5 A |
| 5,130,897 A | * | 7/1992 | Kuzma | 362/24 |
| 5,138,119 A | * | 8/1992 | Demeo | 200/5 A |
| 5,265,274 A | * | 11/1993 | Knutson et al. | 455/347 |
| 5,401,927 A | * | 3/1995 | Lundell et al. | 200/314 |
| 5,555,550 A | * | 9/1996 | Kaschke | 455/566 |
| 6,621,446 B1 | * | 9/2003 | Chaillie | 341/176 |

* cited by examiner

*Primary Examiner*—Renee Luebke
*Assistant Examiner*—Gunyoung T. Lee
(74) *Attorney, Agent, or Firm*—Barbara R. Doutre

(57) ABSTRACT

A keypad assembly (100) for a communication device (200) utilizes two boards, a main circuit board (102) with electronic components including light emitting diodes (LEDs) (104) and a keypad board (108). A lightguide (106) is sandwiched between the two boards (102, 108), the lightguide having window protrusions (112) to accommodate the LEDs (104). The keypad board (108) has openings (116) within which the window protrusions (112) align in order to provide backlighting and sealing to the communication device (200).

18 Claims, 4 Drawing Sheets

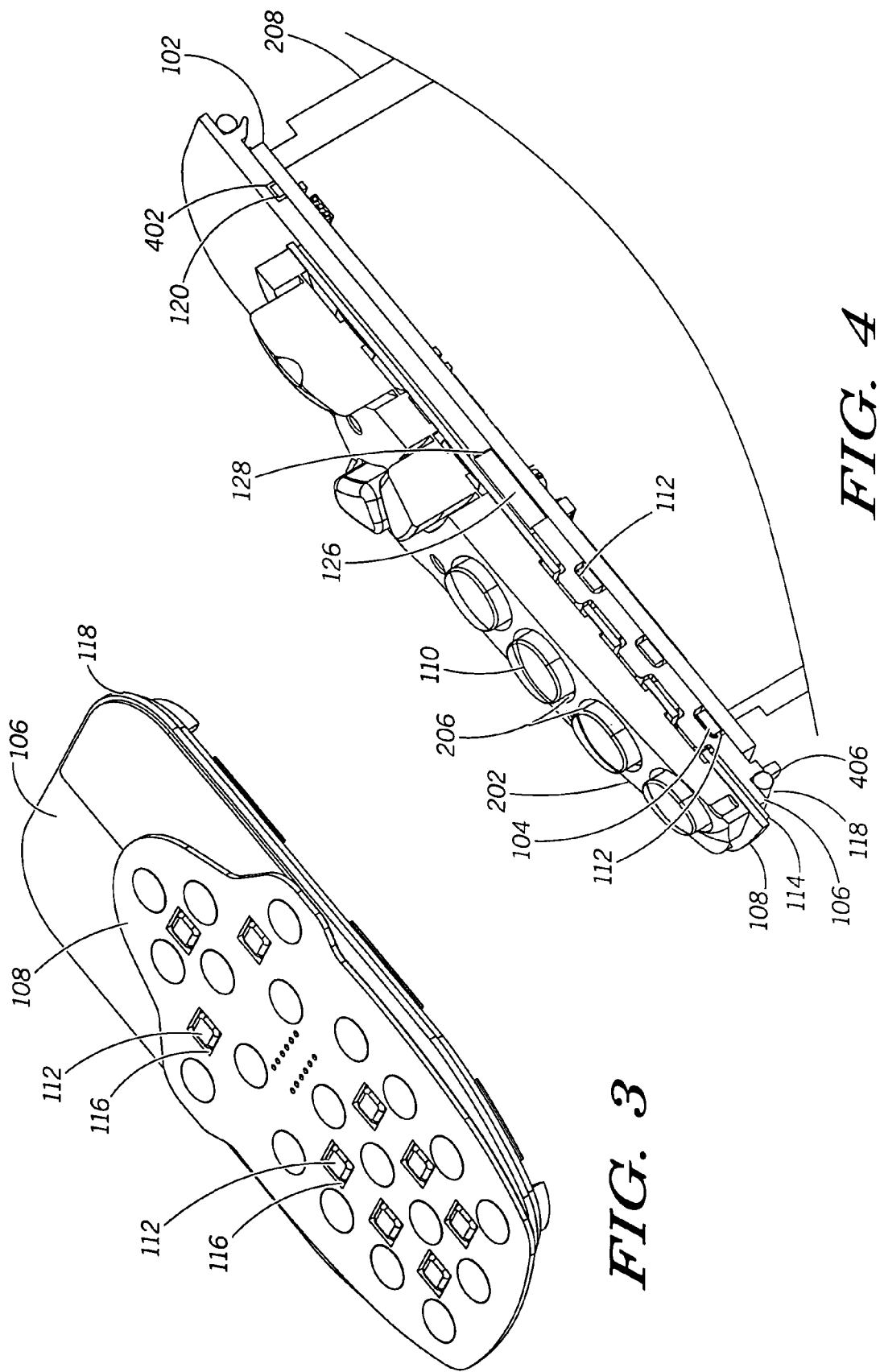

KEYPAD ASSEMBLY

TECHNICAL FIELD

This invention relates in general to keypad assemblies for communication products and more particularly to the sealing and backlighting of such assemblies.

BACKGROUND

Communication products, such as mobile radios, must operate in adverse environments. Sealing is a top priority when manufacturing such devices. While communication products get smaller, user interfaces remain driven by human factors and usability. As a result, user interfaces, such as the keypad, take up a greater percentage of the product size, leaving less space for sealing. Previous implementations of sealed keypads have required additional size to accommodate perimeter sealing, but this limits the amount of available surface area for user interface.

Backlighting the keypad presents many challenges when designing submersible products having tight space constraints. Assemblies that use light emitting diodes (LEDs) located directly behind the keypad surface have issues with even illumination. Furthermore, the keypad may possibly be cut or nicked by the LEDs if the product is dropped causing both the backlighting and sealing to be impaired. Assemblies that use a separate keypad board with the LEDs mounted directly on the keypad board are also susceptible to water damage.

Accordingly, there is a need for a keypad assembly that provides improved sealing and backlighting features.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 3 is an isometric view of an assembled keypad assembly in accordance with the present invention;

FIG. 4 is cross sectional view of the keypad assembly in accordance with the present invention.

DETAILED DESCRIPTION OF THE PREFERRED EMBODIMENT

Figure 1:
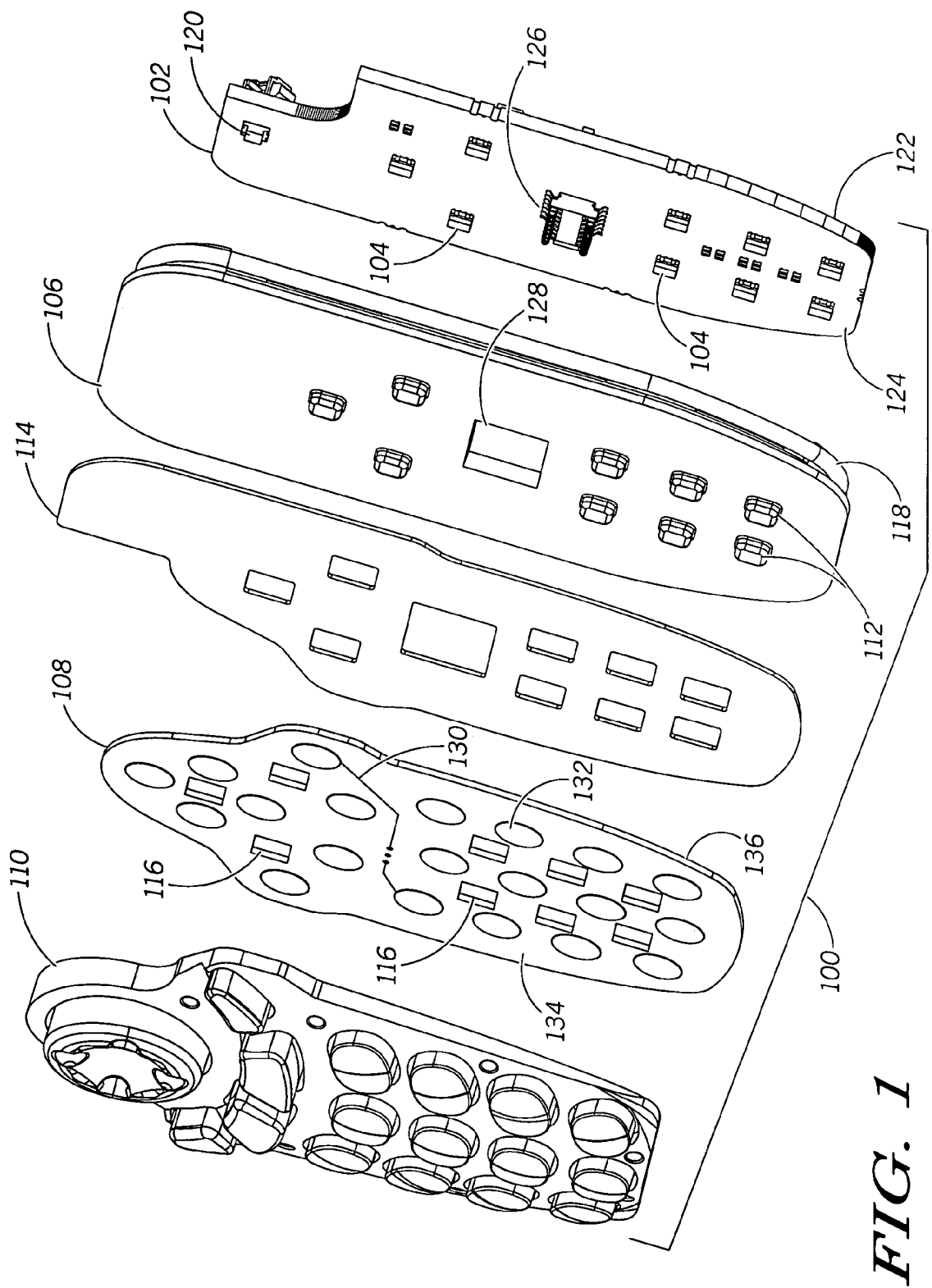
FIG. 1 is an exploded view of the keypad assembly in accordance with the invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein a keypad assembly for a communication device that includes a main circuit board for LEDs, a keypad board and a lightguide sandwiched therebetween. The lightguide of the present invention includes recesses to accommodate the LEDs, and the keypad board has openings within which the recesses fit in order to provide both backlighting and sealing to the communication device.

FIG. 1 is an exploded view of a keypad assembly 100 in accordance with the invention. The keypad assembly 100 of the present invention includes a main circuit board 102 having light emitting diodes (LEDs) 104 disposed thereon, a lightguide 106 for coupling to the main circuit board, a keypad board 108 for coupling to the lightguide, and a keypad membrane 110 for coupling to the keypad board. For the purposes of this application, the lightguide 106 comprises a unitary molded piece of translucent plastic or other similar material having light transmissive properties. In accordance with the present invention, the lightguide 106 has window protrusions 112 formed therein for accommodating the LEDs 104.

The keypad board 108 gets coupled to the lightguide via a sealing member 114. Sealing member 114 is preferably formed of an adhesive layer but can also be formed of a compressible material that can form a seal when the keypad board 108 and lightguide 106 are coupled together. In accordance with the present invention, the keypad board 108 has openings 116 that align with the window protrusions 112 of the lightguide 106. In order to provide further sealing, the lightguide includes a track 406 (seen in FIG. 4) within which the main circuit board 102 is retained and about which an o-ring 118 is coupled.

In the preferred embodiment of the invention, the main circuit board 102 is a printed circuit board (pcb) having first and second surfaces 122, 124 with electronic components 120 disposed on at least one of these surfaces. For the purposes of this application, the LEDs 104 will be referred to independently of other electronic components 120. Thus, the LEDs 104 are disposed on the second surface 124 of the main circuit board 102 along with a connector 126. Connector 126 provides the electrical interconnect between the main circuit board 102 and keypad board 108. While the lightguide includes window protrusions to accommodate the LEDs 104, the lightguide 106 may further comprise recesses 402 (seen in cross sectional view of FIG. 4) to accommodate any electronic components 120 located on the second surface of the main circuit board. Thus, the lightguide is formed of a predetermined thickness having first and second sides with the window protrusions protruding from one surface and the recesses, if any, formed within the predetermined thickness. The lightguide also includes an aperture 128 for accommodating the connector 126. The lightguide configuration of window protrusions 112, recesses 402, and aperture 128 allows the lightguide 106 to sit flush between the keypad board 108 and the main circuit board 102.

The keypad board 108, preferably a printed circuit board, has front and back surfaces 134, 136 with popple switches 132 embedded on the front surface connected via runners 130. The front surface 134 is coated with an integral laminate, such as mylar or a clear plastic sheet (not shown). The keypad board 108 further comprises contacts (not shown) on the back surface 136 for mating the main circuit board's connector 126 to the popple switches 132. The keypad board 108 need not go through a soldering process since it has no discrete electrical components. The LEDs 104 are protected from water damage in that they are not located directly on top of the keypad board 108, but rather protected by the lightguide window protrusions 112.

Figure 2:
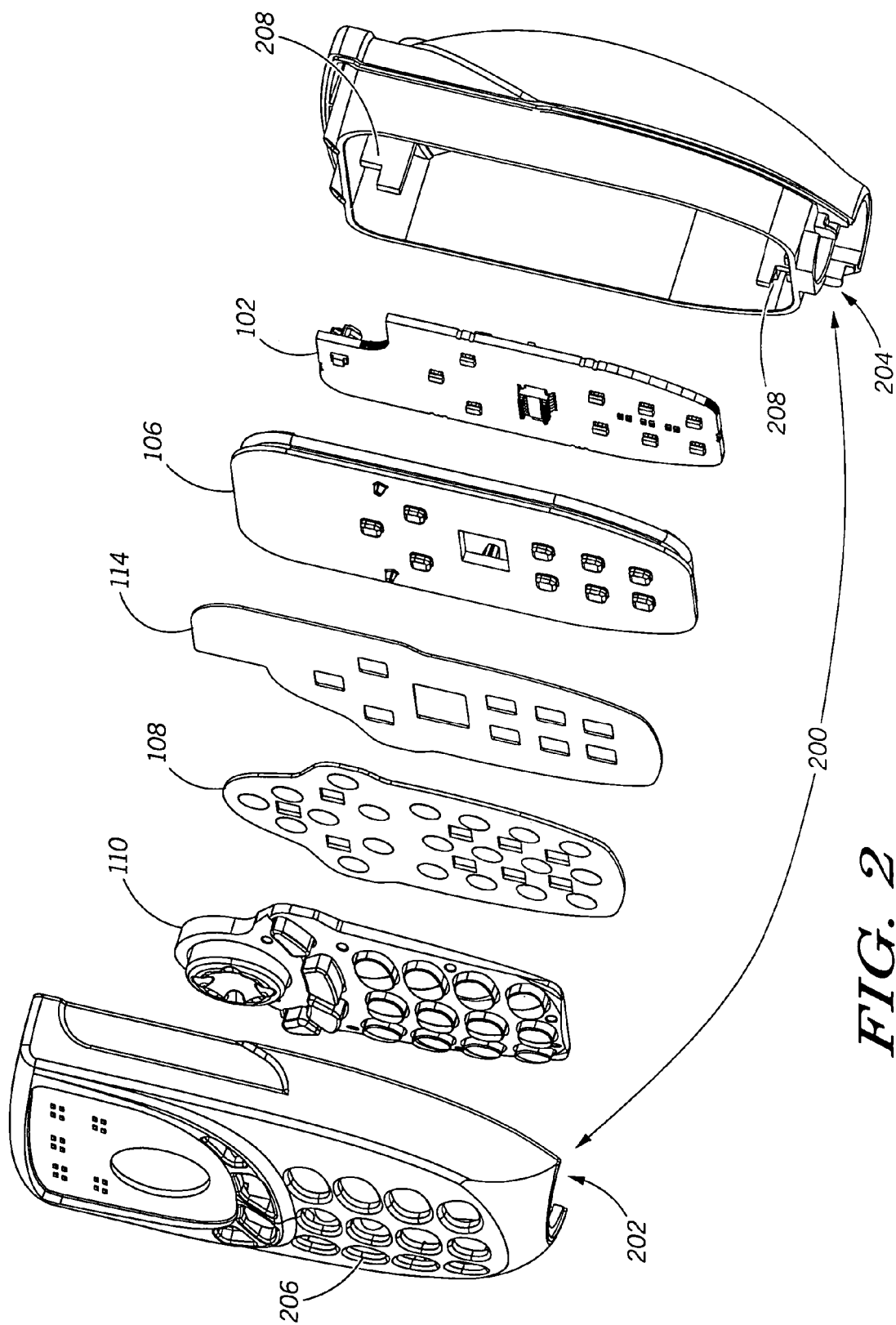
FIG. 2 is an exploded view of the keypad assembly of FIG. 1 in conjunction with a housing for a communication device.

FIG. 2 is an exploded view of the keypad assembly of FIG. 1 in conjunction with a housing for a communication device 200. First housing portion 202 provides a front housing for receiving the keypad membrane 110 while second housing portion 204 provides a back housing to support the main circuit board 102. The front housing portion 202 includes holes 206 for receiving the keypad membrane 110. The back housing portion 204 includes supports 208 to support the main circuit board 102.

FIG. 3 is an isometric view of an assembled keypad assembly (without the keypad membrane) in accordance with the present invention. As seen in this view, a substantially planar surface is formed when the keypad board openings 116 are aligned with the window protrusions 112 of the lightguide 106. To achieve this planarity, the thickness of the window protrusions 112 on the lightguide 106 and the thickness of the keypad board 108 should be about the same. Once assembled, the lightguide 106 facilitates both backlighting and sealing. The keypad board 108, lightguide 106, sealing member 114, o-ring 118 and back housing 204 provide a sealed envelope for the communication device 200. The LEDs 104 are protected from moisture by the window protrusions 112. All necessary electrical components, LED's and connectors have been placed on one main circuit board 102. Thus, the keypad board 108 does not require any soldering process thereby providing a distinct advantage over known assembly processes.

FIG. 4 is cross sectional view of the keypad assembly in accordance with the present invention. As seen in this view, the front and back housing portions 202, 204 of the communication device 200 enclose and retain the keypad assembly through holes 206 for the keypad membrane 110 and supports 208 in the back housing 204. In this view, the lightguide's track 406 within which the main circuit board 102 is seated and about which the o-ring is coupled can be seen. The keypad board 108, sealing member 114, lightguide 106, o-ring 118 and back housing 204 provide a sealed envelope to protect the main circuit board 102. Thus, the use of the separate keypad board maximizes available space without the use of any electrical components.

Figure 5:
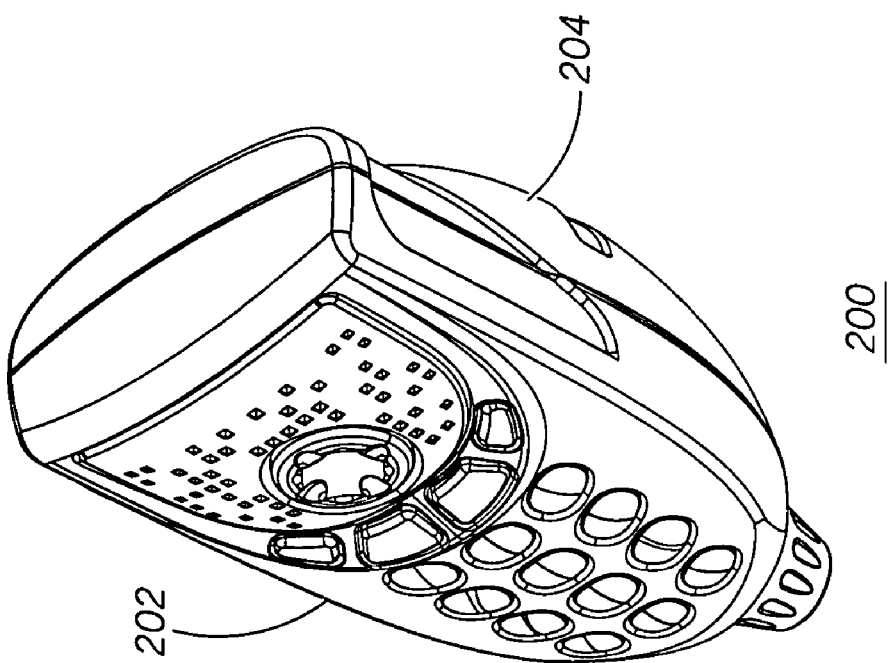
FIG. 5 is a communication device incorporating the keypad assembly of the present invention.

FIG. 5 is the communication device 200 fully assembled and incorporating the keypad assembly 100 of the present invention. If water seeps in between the holes 206 and keypad membrane 110, the sealed envelope formed by the lightguide window protrusions, keypad board, seal member, o-ring and back housing 204 will keep the water away from the main circuit board where the LEDs and other electronic components are located. Since the LEDs are located on the main circuit board the likelihood of tearing the keypad membrane 110, if communication device 200 is dropped, has been eliminated. The distribution and geometry of the lightguide window protrusions can be varied as appropriate to provide even illumination across the keypad membrane 110. Accordingly, there has been provided a keypad assembly with improved backlighting and sealing capabilities for a communication device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A keypad assembly for a communication device, comprising:
   a main circuit board for light emitting diodes (LEDs);
   a keypad board, wherein the keypad board is a printed circuit board (pcb);
   a sealing means;
   a lightguide coupled to the keypad board via the sealing means, the light guide being sandwiched between the main circuit board and keypad board, the lightguide having window protrusions to accommodate the LEDs, the keypad board having openings within which the window protrusions fit in order to provide backlighting and sealing to the communication device.

2. The keypad assembly of claim 1, wherein the sealing member comprises an adhesive layer.

3. The keypad assembly of claim 2, wherein the sealing member comprises a compressible material.

4. The keypad assembly of claim 1, further comprising:
   electronic components disposed on the main circuit board; and
   recesses formed in the lightguide to accommodate the electronic components.

5. The keypad assembly of claim 1, wherein the keypad member is translucent.

6. The keypad assembly of claim 1, wherein the main circuit board is a printed circuit board (pcb).

7. A keypad assembly, comprising:
   a main circuit board;
   light emitting diodes (LEDs) coupled to the main circuit board;
   a lightguide coupled to the main circuit board, the lightguide having window protrusions formed therein for accommodating the LEDs, wherein the lightguide includes a track within which the main circuit board is retained and about which an o-ring is coupled;
   a keypad board coupled to the lightguide, the keypad board having openings that align with the window protrusions of the lightguide; and
   a keypad membrane coupled to the keypad board.

8. The keypad assembly of claim 7, wherein the lightguide is formed as a unitary molded piece.

9. The keypad assembly of claim 8, wherein a substantially planar surface is formed when the keypad board openings are aligned with the window protrusions of the lightguide.

10. The keypad assembly of claim 9, further comprising a back housing coupled to the o-ring such that the keypad board, lightguide, o-ring and back housing provide a sealed area for the main circuit board.

11. A keypad assembly for a communication device, comprising:
   a main circuit board having first and second surfaces;
   electronic components disposed on at least one of the first and second surfaces of the main circuit board;
   light emitting diodes (LEDs) disposed on the second surface of the main circuit board;
   a connector coupled to the second surface of the main circuit board;
   a lightguide coupled to the main circuit board, the lightguide having window protrusions formed therein for accommodating the LEDs and recesses formed therein for accommodating any electronic components located on the second surface of the main circuit board, the lightguide further including an aperture for accommodating the connector; and
   a keypad board coupled to the lightguide through an adhesive layer, the keypad board having openings that align with the window protrusions of the lightguide to form a substantially planar surface, the keypad board mating with the connector; and a keypad membrane coupled to the keypad board.

12. The keypad assembly of claim 11, wherein the lightguide includes a track within which the main circuit board is retained and about which an o-ring is coupled.

13. The keypad assembly of claim 12, wherein the lightguide is formed as a unitary molded piece.

14. The keypad assembly of claim 13, further comprising a front and back housing of the communication device for retaining the keypad assembly.

15. The keypad assembly of claim 14, wherein the keypad board, adhesive layer, lightguide, o-ring provide and back housing provide a sealed area for the main circuit board.

16. The keypad assembly of claim 11, wherein the LEDs provide backlighting to the keypad.

17. The keypad assembly of claim 11, wherein the keypad member is translucent.

18. The keypad assembly of claim 11, wherein the keypad board does not require any soldering process.

* * * * *